N. PATTS.
HARNESS TUG.
APPLICATION FILED NOV. 27, 1920.
1,399,869.
Patented Dec. 13, 1921.
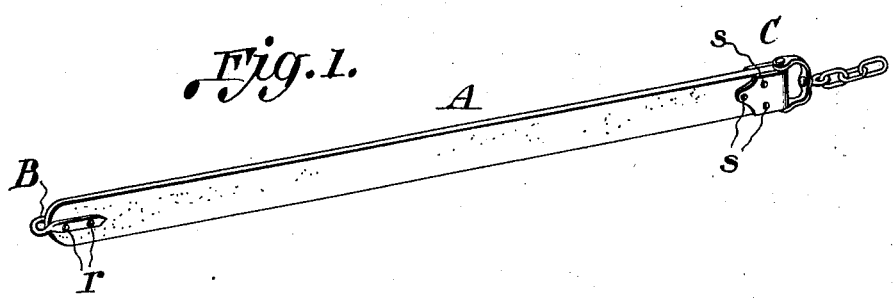
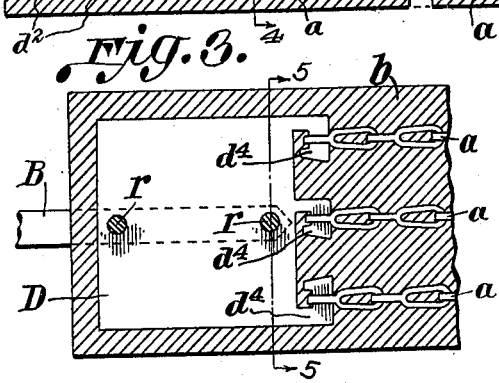
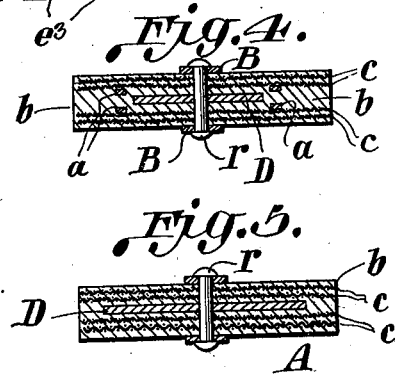
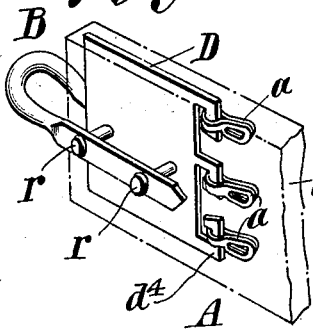
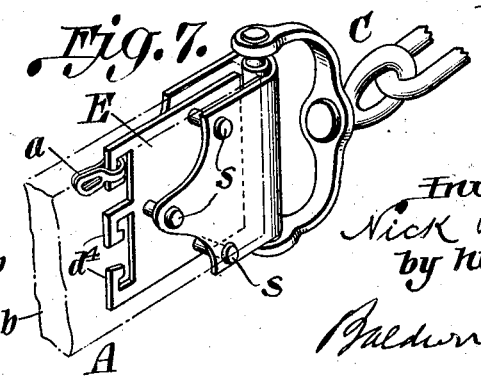
Inventor
Nick Patts
by his Attorneys
Baldwin Wight

UNITED STATES PATENT OFFICE.

NICK PATTS, OF SAN ANTONIO, TEXAS.

HARNESS-TUG.

1,399,869. Specification of Letters Patent. Patented Dec. 13, 1921.

Application filed November 27, 1920. Serial No. 426,701.

*To all whom it may concern:*

Be it known that I, NICK PATTS, a subject of the King of Greece, residing at San Antonio, in the county of Bexar and State of Texas, have invented certain new and useful Improvements in Harness-Tugs, of which the following is a specification.

This invention relates to tugs or short harness traces, in which in order to add strength and durability metallic reinforcing means are associated with the other material ordinarily employed. Thus it has been heretofore proposed to construct tugs or traces in which chains are arranged longitudinally of the tug between strips of leather and it has been proposed to embed wire cloth or netting in a strap or trace made of layers of rubber and fabric.

According to my invention I construct a tug by embedding longitudinally arranged chains in rubber and fabric, the rubber being so vulcanized as to hold the chains securely in place and completely cover them. In order to resist endwise strain, I have provided anchor plates at opposite ends of the tug to which the ends of the chains are connected. These plates are embedded in the rubber and they also serve to form a secure connection between the ends of the tug and the metal loops or fastening devices to which other parts of the harness or vehicle are connected.

In the accompanying drawings:—

Figure 1 is a perspective view of a harness tug embodying my improvements.

The remaining figures are on an enlarged scale.

Fig. 2 is a sectional view showing how the chains and anchor plates are embedded in the rubber and how the chains are connected with the anchor plates.

Fig. 3 is a detail view in section showing a modified form of anchor plate.

Fig. 4 shows a transverse section on the line 4—4 of Fig. 2.

Fig. 5 shows a transverse section on the line 5—5 of Fig. 3.

Figs. 6 and 7 are perspective views illustrating how the loops or fastening devices at the ends of the tug are connected with the tug.

The harness tug shown in Fig. 1 comprises a main body portion A and devices B and C at each end by which the tug may be connected with other parts of the harness or with the vehicle. These devices B and C are of well known construction. The body of the tug is made of chains $a$ embedded in rubber $b$ and canvas $c$, the ends of the chains being attached to anchor plates D and E also embedded in the rubber.

The chains may be of any usual kind. Their opposite ends are attached to the anchor plates in the manner indicated in Fig. 2 and the anchor plates and chains are embedded in the rubber and covered by it. The tug thus made is vulcanized in such manner as to produce a smooth strong article of the kind illustrated in Fig. 1.

The plate D consists of a body portion $d$ having a central opening $d'$ through which the rubber extends so that parts of the rubber on opposite sides of the plate may be firmly bound together. At one end the plate is formed with laterally extending hook arms $d^2$ to engage the ends of the two side chains $a$ and at its opposite end the plate D is formed with a recess, within which are arranged hooks $d^3$ which engage the adjacent end of the central chain $a$. The other anchor plate E is attached to the opposite end of the tug. It comprises a body portion $e$ having an opening $e'$ through which rubber extends and it has an inwardly extending arm $e^2$ recessed as shown and provided with hooks $e^3$ which engage the adjacent links of the center chain $a$.

The plate D is formed with holes $x$ to receive rivets $r$ and the plate E is formed with holes $y$ to receive rivets $s$. The plates and chains are connected in the manner shown, rubber and fabric are applied, and the whole vulcanized in any suitable way.

At one end the tug is provided with a fastening device B which is connected to the tug by rivets $r$ which extend through the holes $x$ in the plate. The fastening device C is connected with the opposite end of the tug by means of rivets $s$ which extend through the holes $y$ in the anchor plate D. In this way a very strong and substantial tug is obtained. The chains are firmly inclosed in the rubber as are also the anchor plates. When strain is applied, the anchor plates resist any tendency of the chains to slip longitudinally.

In Figs. 3 and 5 I have shown a slight modification. In this case the anchor plate D is of simplified construction. The central opening $d'$ is omitted and hooks $d^4$ are provided at the inner end of the plate, in this case there being no lateral hooks like those, $d^2$, in Fig. 2.

By reference to Fig. 2 it will be observed that each chain engages two hooks on each anchor plate, two links at the end of each chain being engaged with two corresponding hooks. This is a preferred construction when additional security is desired.

Figs. 6 and 7 illustrate more clearly the manner of connecting the fastening devices B and C with the tug, and it will be observed that the anchor plates serve not only to hold the ends of the chains, but they also serve to receive the rivets which connect the fastening devices to the tug. As the strain is applied through the fastening devices to the tug, it is important that the rivets should not tear the rubber and fabric of which the body of the tug is made. The metallic plates serve to prevent this.

I claim as my invention:

1. A harness tug, comprising longitudinally arranged chains embedded in plastic material, and anchor plates at the ends of the tug also embedded in and covered by the plastic material and to which the ends of said chains are connected.

2. A harness tug, comprising longitudinally arranged chains embedded in plastic material, and anchor plates at the end of the tug also embedded in and covered by the plastic material and having hooks to which the ends of said chains are connected.

3. A harness tug, comprising longitudinally arranged chains embedded in plastic material, anchor plates at the ends of the tug made of sheet metal also embedded in and covered by the plastic material and having hooks to which the ends of said chains are connected, and fastening devices at the ends of the tug applied to the outside thereof and connected with the anchor plates.

4. A harness tug, comprising longitudinally arranged chains embedded in plastic material, anchor plates at the ends of the tug also embedded in and covered by plastic material to which the ends of said chains are connected, fastening devices at the ends of the tug applied to the outside thereof, and rivets for connecting the fastening devices to the ends of the tug which extend through said anchor plates.

In testimony whereof, I have hereunto subscribed my name.

NICK PATTS.